(12) United States Patent
Helferich (10) Patent No.: US 6,636,733 B1
(45) Date of Patent: Oct. 21, 2003

(54) WIRELESS MESSAGING METHOD

(75) Inventor: Richard J. Helferich, Chapel Hill, NC (US)

(73) Assignee: Thompson Trust, Los Angeles, CA (US)

( * ) Notice: Subject to any disclaimer, the term of this patent is extended or adjusted under 35 U.S.C. 154(b) by 0 days.

(21) Appl. No.: 09/540,490

(22) Filed: Mar. 31, 2000

Related U.S. Application Data (63) Continuation-in-part of application No. 09/408,841, filed on Sep. 30, 1999, and a continuation-in-part of application No. 08/934,143, filed on Sep. 19, 1997, now Pat. No. 6,233,430, and a continuation-in-part of application No. 08/933,344, filed on Sep. 19, 1997, now Pat. No. 6,253,061, and a continuation-in-part of application No. 08/934,132, filed on Sep. 19, 1997, now Pat. No. 6,087,956, and a continuation-in-part of application No. 08/934,337, filed on Sep. 19, 1997, now Pat. No. 6,259,892, and a continuation-in-part of application No. 08/989,874, filed on Dec. 12, 1997, now Pat. No. 6,097,941.

(60) Provisional application No. 60/155,055, filed on Sep. 21, 1999, and provisional application No. 60/126,939, filed on Mar. 29, 1999.

(51) Int. Cl.[7] .......................... H04M 3/42; H04M 11/10; H04M 1/64; H04Q 7/20
(52) U.S. Cl. ................. 455/412; 455/414; 455/466; 379/88.17
(58) Field of Search ................. 455/412, 414, 455/466; 379/88.17

(56) References Cited

U.S. PATENT DOCUMENTS

| | | |
|---|---|---|
| 3,118,145 A | 1/1964 | Nee |
| 4,480,253 A | 10/1984 | Anderson |
| 4,644,352 A | 2/1987 | Fujii |
| 4,737,979 A | 4/1988 | Hashimoto |
| 4,812,843 A | 3/1989 | Champion, III et al. |
| 4,821,308 A | 4/1989 | Hashimoto |
| 4,825,456 A | 4/1989 | Rosenberg |
| 4,845,491 A | 7/1989 | Fascenda et al. |
| 4,853,688 A | 8/1989 | Andros et al. |
| 4,868,560 A | 9/1989 | Oliwa et al. |
| 4,897,835 A | 1/1990 | Gaskill et al. |
| 4,942,598 A | 7/1990 | Davis |
| 4,961,216 A | 10/1990 | Baehr et al. |
| 4,965,569 A | 10/1990 | Bennett et al. |
| 4,975,694 A | 12/1990 | McLaughlin et al. |
| 5,003,576 A | 3/1991 | Helferich |
| 5,005,013 A | 4/1991 | Tsukamoto et al. |
| 5,007,105 A | 4/1991 | Kudoh et al. |
| 5,029,199 A | 7/1991 | Jones et al. ............. 379/88.26 |
| 5,040,204 A | 8/1991 | Sasaki et al. |
| 5,043,721 A | 8/1991 | May |
| 5,047,763 A | 9/1991 | Kuznicki et al. |

(List continued on next page.)

FOREIGN PATENT DOCUMENTS

| | | |
|---|---|---|
| EP | 0 631 419 A1 | 12/1994 |
| EP | 0 631 419 A1 | 12/1994 |
| EP | 0 777 394 A1 | 6/1997 |
| EP | 0 831 664 A2 | 9/1997 |
| WO | WO 98/58476 | 12/1998 |
| WO | WO 99 65256 A | 12/1999 |

OTHER PUBLICATIONS

Document: Statutory Invention Registration No. H610; Date: Mar. 7, 1989; Inventor: Focarile et al.

Primary Examiner—William Cumming
(74) Attorney, Agent, or Firm—Rothwell, Figg, Ernst & Manbeck (57) ABSTRACT

A messaging system for selectively performing an action on information, for remote retrieval of messages, for performing action on information at different times, for selective paging, for providing a user interface for message access and having integrated audio visual messaging.

22 Claims, 3 Drawing Sheets

U.S. PATENT DOCUMENTS

| | | |
|---|---|---|
| 5,065,423 A | 11/1991 | Gaskill |
| 5,093,659 A | 3/1992 | Yamada |
| 5,115,233 A | 5/1992 | Zdunek et al. |
| 5,117,449 A | 5/1992 | Metroka et al. |
| 5,128,980 A | 7/1992 | Choi |
| 5,134,724 A | 7/1992 | Gehring et al. |
| 5,138,311 A | 8/1992 | Weinberg |
| 5,138,312 A | 8/1992 | Tsukamoto et al. |
| 5,140,419 A | 8/1992 | Galumbeck et al. |
| 5,146,612 A | 9/1992 | Grosjean et al. |
| 5,153,903 A | 10/1992 | Eastmond et al. |
| 5,159,331 A | 10/1992 | Park et al. |
| 5,159,713 A | 10/1992 | Gaskill et al. |
| 5,173,688 A | 12/1992 | DeLuca et al. |
| 5,175,758 A | 12/1992 | Levanto et al. |
| 5,177,780 A | 1/1993 | Kasper et al. |
| 5,182,553 A | 1/1993 | Kung |
| 5,185,604 A | 2/1993 | Nepple et al. |
| 5,192,947 A | 3/1993 | Neustein |
| 5,194,857 A | 3/1993 | Gomez |
| 5,212,636 A | 5/1993 | Nakazawa |
| 5,220,366 A | 6/1993 | King |
| 5,227,774 A | 7/1993 | Benoist |
| 5,239,466 A | 8/1993 | Morgan et al. |
| 5,239,679 A | 8/1993 | Murai |
| 5,241,305 A | 8/1993 | Fascenda et al. |
| 5,247,700 A | 9/1993 | Wohl et al. |
| 5,257,307 A | 10/1993 | Ise |
| 5,265,033 A | 11/1993 | Vajk et al. |
| 5,285,426 A | 2/1994 | Teodoridis |
| 5,315,635 A | 5/1994 | Kane et al. |
| 5,329,501 A | 7/1994 | Meister et al. |
| 5,379,031 A | 1/1995 | Mondrosch et al. |
| 5,396,537 A | 3/1995 | Schwendeman |
| 5,398,021 A | 3/1995 | Moore |
| 5,402,466 A | 3/1995 | Delahanty |
| 5,406,557 A | 4/1995 | Baudoin |
| 5,410,302 A | 4/1995 | Dulaney, III et al. |
| 5,418,835 A | 5/1995 | Frohman et al. |
| 5,426,422 A | 6/1995 | Vanden Heuvel et al. |
| 5,426,594 A | 6/1995 | Wright et al. |
| 5,428,663 A | 6/1995 | Grimes et al. |
| 5,432,839 A | 7/1995 | DeLuca |
| 5,440,559 A | 8/1995 | Gaskill |
| 5,444,671 A | 8/1995 | Tschannen et al. |
| 5,448,759 A | 9/1995 | Krebs et al. |
| 5,452,356 A | 9/1995 | Albert |
| 5,455,579 A | 10/1995 | Bennett et al. |
| 5,455,823 A | 10/1995 | Noreen et al. |
| 5,457,732 A | 10/1995 | Goldberg |
| 5,463,672 A | 10/1995 | Kage |
| 5,473,143 A | 12/1995 | Vak et al. |
| 5,473,667 A | 12/1995 | Neustein |
| 5,475,653 A | 12/1995 | Yamada et al. |
| 5,479,378 A | 12/1995 | Yamada et al. |
| 5,479,408 A | 12/1995 | Will |
| 5,481,255 A | 1/1996 | Albert et al. |
| 5,483,352 A | 1/1996 | Fukuyama et al. |
| 5,483,595 A | 1/1996 | Owen |
| 5,485,503 A | 1/1996 | Diem |
| 5,487,100 A | 1/1996 | Kane |
| 5,489,894 A | 2/1996 | Murray |
| 5,497,373 A | 3/1996 | Hulen et al. |
| 5,530,438 A | 6/1996 | Bickham et al. |
| 5,530,930 A | 6/1996 | Hahn |
| 5,550,535 A | 8/1996 | Park |
| 5,555,446 A | 9/1996 | Jasinski |
| 5,557,659 A | 9/1996 | Hyde-Thompson |
| 5,561,702 A | 10/1996 | Lipp et al. |
| 5,564,018 A | 10/1996 | Flores et al. |
| 5,572,196 A | 11/1996 | Sakumoto et al. |
| 5,572,488 A | 11/1996 | Yamada et al. |
| 5,579,372 A | 11/1996 | Astrom |
| 5,581,593 A | 12/1996 | Engelke et al. |
| 5,588,009 A | 12/1996 | Will |
| 5,592,532 A | 1/1997 | Koizumi et al. |
| 5,600,703 A | 2/1997 | Dang et al. |
| 5,604,788 A | 2/1997 | Tett |
| 5,608,786 A | 3/1997 | Gordon |
| 5,623,242 A | 4/1997 | Dawson, Jr. et al. |
| 5,627,525 A | 5/1997 | Kudoh et al. |
| 5,630,060 A | 5/1997 | Tang et al. |
| 5,630,207 A | 5/1997 | Gitlin et al. |
| 5,633,916 A | 5/1997 | Goldhagen et al. |
| 5,635,918 A | 6/1997 | Tett |
| 5,644,627 A | 7/1997 | Segal et al. |
| 5,649,305 A | 7/1997 | Yoshida |
| 5,654,942 A | 8/1997 | Akahane |
| 5,663,703 A | 9/1997 | Pearlman et al. |
| 5,675,507 A | 10/1997 | Bobo, II |
| 5,675,627 A | 10/1997 | Yaker |
| 5,678,179 A | 10/1997 | Turcotte et al. |
| 5,684,859 A | 11/1997 | Chanroo et al. |
| 5,694,120 A | 12/1997 | Indekeu et al. |
| 5,696,500 A | 12/1997 | Diem |
| 5,717,742 A | 2/1998 | Hyde-Thompson |
| 5,724,410 A * | 3/1998 | Parvulescu et al. ...... 379/88.17 |
| 5,726,643 A | 3/1998 | Tani |
| 5,737,394 A | 4/1998 | Anderson et al. |
| 5,737,395 A | 4/1998 | Irribarren |
| 5,742,668 A | 4/1998 | Pepe et al. |
| 5,745,689 A | 4/1998 | Yeager et al. |
| 5,751,793 A | 5/1998 | Davies et al. |
| 5,761,622 A | 6/1998 | Priest |
| 5,774,803 A | 6/1998 | Kariya |
| 5,781,857 A | 7/1998 | Hwang et al. |
| 5,796,394 A | 8/1998 | Wicks et al. |
| 5,805,886 A | 9/1998 | Skarbo et al. |
| 5,809,130 A | 9/1998 | Ayala |
| 5,812,795 A | 9/1998 | Horovitz et al. |
| 5,815,800 A | 9/1998 | Su et al. |
| 5,828,882 A | 10/1998 | Hinckley |
| 5,835,089 A | 11/1998 | Skarbo et al. |
| 5,838,252 A | 11/1998 | Kikinis |
| 5,850,594 A | 12/1998 | Cannon et al. |
| 5,870,030 A | 2/1999 | DeLuca et al. |
| 5,870,454 A | 2/1999 | Dahlen |
| 5,872,926 A | 2/1999 | Levec et al. |
| 5,875,436 A | 2/1999 | Kikinis |
| 5,884,159 A | 3/1999 | Thro et al. |
| 5,892,909 A | 4/1999 | Grasso et al. |
| 5,905,495 A | 5/1999 | Tanaka et al. |
| 5,907,805 A * | 5/1999 | Chotai ........................ 455/414 |
| 5,913,032 A | 6/1999 | Schwartz et al. |
| 5,938,725 A | 8/1999 | Hara |
| 5,948,059 A | 9/1999 | Woo et al. |
| 5,951,638 A | 9/1999 | Hoss et al. |
| 5,961,590 A | 10/1999 | Mendez et al. |
| 5,961,620 A | 10/1999 | Trent et al. |
| 5,963,618 A | 10/1999 | Porter |
| 5,974,447 A | 10/1999 | Cannon et al. |
| 6,021,433 A | 2/2000 | Payne et al. |
| 6,087,956 A | 7/2000 | Helferich |
| 6,097,941 A | 8/2000 | Helferich |
| 6,233,430 B1 | 5/2001 | Helferich |
| 6,253,061 B1 | 6/2001 | Helferich |
| 6,259,892 B1 | 7/2001 | Helferich |
| 6,370,389 B1 * | 4/2002 | Isomursu et al. ............ 455/466 |
| 6,233,318 B1 * | 5/2002 | Picard et al. ............. 379/88.17 |
| 6,292,668 B1 * | 9/2002 | Alanara et al. ............. 455/466 |
| 6,459,360 B1 | 10/2002 | Helferich |
| 6,462,646 B2 | 10/2002 | Helferich |

\* cited by examiner

WIRELESS MESSAGING METHOD

This application is a continuation-in-part of U.S. application Ser. No. 09/408,841, filed Sep. 30, 1999 (status: Pending), which claims the benefit of U.S. Provisional Application No. 60/155/055, filed Sep. 21, 1999 and U.S. Provisional Application No. 60/126,939, filed Mar. 29, 1999; this application is also a continuation-in-part of U.S. application Ser. No. 08/934,143, filed Sep. 19, 1997 (status: U.S. Pat. No. 6,233,430), U.S. application Ser. No. 08/933,344, filed Sep. 19, 1997 (status: U.S. Pat. No. 6,253,061), U.S. application Ser. No. 08/934,132, filed Sep. 19, 1997 (status: U.S. Pat. No. 6,087,956), U.S. application Ser. No. 08/934,337, filed Sep. 19, 1997 (status: U.S. Pat. No. 6,259,892), and U.S. application Ser. No. 08/989,874, filed Dec. 12, 1997 (status: U.S. Pat. No. 6,097,941). All of the above mentioned applications (provisional and non-provisional) are incorporated in their entirety herein by this reference.

BACKGROUND OF THE INVENTION

The present invention relates to wireless messaging devices such as two-way pagers, wireless telephones and personal digital assistants (PDA's) and, electronic media systems such as, electronic mail systems, electronic commerce systems and storage and retrieval systems. More specifically, the present invention relates to two-way wireless email devices and associated systems.

SUMMARY OF THE INVENTION

The present invention generally relates to systems and/or methods for wireless messaging. In one embodiment, the present invention provides a method for providing direct message access to a user having a wireless messaging device configured to receive text messages. The method includes the steps of: receiving a message intended for the user; storing the message; assigning a message identifier to the message, the message identifier including a callback number; and transmitting to the wireless messaging device a message comprising the message identifier.

In another embodiment, the present invention provides a method for notifying a user who is in possession of a wireless messaging device configured to receive text messages that the user has a voice message and for providing the user with direct access to the voice message. The method includes the steps of: storing the voice message; associating a message code with the voice message; generating a text message, wherein the text message includes the message code; transmitting the text message to the wireless messaging device; receiving at a voice message processor a telephone call placed from the wireless messaging device; receiving the message code from the wireless messaging device; using the message code transmitted from the wireless messaging device to retrieve the stored voice message; and transmitting the voice message to the wireless messaging device, thereby enabling the wireless messaging device to reproduce the voice message.

In another embodiment, the present invention provides a method for notifying a user who is in possession of a wireless messaging device configured to receive text messages that the user has a voice message and for providing the user with direct access to the voice message. The method includes the steps of: storing the voice message; associating a message code with the voice message, the message code including a callback number; generating a text message, wherein the text message includes the message code; transmitting the text message to the wireless messaging device; receiving at a voice message processor a telephone call placed from the wireless messaging device, wherein the telephone number associated with the telephone call is the callback number; retrieving the stored voice message; and transmitting the voice message to the wireless messaging device, thereby enabling the wireless messaging device to reproduce the voice message.

In another embodiment, the present invention provides a method for enabling a user having a wireless messaging device capable of receiving text messages and making telephone calls to create a voice message in reply to a message intended for the user and to have the voice message transmitted to the originator of the message intended for the user. The method includes the steps of: receiving the message intended for the user, wherein the message intended for the user comprises a body and a header; storing the message intended for the user; assigning a message identifier to the message intended for the user; transmitting the message identifier and at least part of the message header to the wireless messaging device; receiving, at a message processor, a phone call placed by the wireless messaging device; prompting the user of the wireless messaging device to transmit a message identifier to the message processor; receiving a message identifier transmitted by the wireless messaging device; prompting the user of the wireless messaging device to dictate a voice message; recording the voice message dictated by the user; determining an address associated with the originator of the message intended for the user; and transmitting the recorded voice message to the address.

In another embodiment, the present invention provides a method for enabling a user having a wireless messaging device capable of receiving text messages and making telephone calls to create a voice message in reply to a message intended for the user and to have the voice message transmitted to the originator of the message intended for the user. The method includes the steps of: receiving the message intended for the user, wherein the message intended for the user comprises a body and a header; storing the message intended for the user; assigning a message identifier to the message intended for the user, the message identifier including a callback number; transmitting the message identifier and at least part of the message header to the wireless messaging device; receiving, at a message processor, a telephone call placed by the wireless messaging device, wherein the telephone number associated with the telephone call is the callback number; prompting the user of the wireless messaging device to dictate a voice message; recording the voice message dictated by the user; determining an address associated with the originator of the message intended for the user; and transmitting the recorded voice message to the address.

In another embodiment, the present invention provides a method for sending messages to a wireless messaging device. The method includes the steps of: receiving at an email server a first message intended for the wireless messaging device; holding the first message at the email server until the wireless messaging device is on line; detecting that the wireless messaging device is on line; assigning a message identifier to the first message, the message identifier including a callback number; and delivering a second message to the wireless messaging device only after detecting that the wireless messaging device is on line, wherein the second message includes the message identifier.

Further features and advantages of the present invention, as well as the structure and operation of various embodiments of the present invention, are described in detail below with reference to the accompanying drawings.

BRIEF DESCRIPTION OF THE DRAWINGS

The accompanying drawings and above identified pending patent applications, which are incorporated herein, form a part of this specification together with this description and serve to explain the principles of the invention and to enable a person skilled in the pertinent art to make and use the invention.

DESCRIPTION OF THE INVENTION

For the purpose of illustration only, a wireless mobile telephone will be used as an exemplary wireless messaging device. However, it should be understood that other messaging devices, such as pagers, wireless PDA's and the like, are also contemplated.

A wireless mobile telephone, hereinafter mobile phone, is configured to receive text messages and message alerts. The mobile phone may be configured to receive Short Messaging Service (SMS) email messages or the mobile phone may have a Web Browser for accessing an Internet based email service. An email server receives an email message intended for a specific mobile telephone. An email message includes a message body and a message header. The message header usually includes various fields, such as a To field, a From field, and a Subject field. The message header also may include a Message Type field and other information common in email messages.

The email server assigns a message identifier (ID) to the message and, in one embodiment, forwards the entire message and the message ID to a mobile system for transmission to the targeted mobile phone. Alternatively, the email server may send to the mobile system just an alert, the From field, and/or the Subject field, but not the entire message. Depending on what was transmitted to the mobile system, the mobile phone user may read the entire message, read whom the message was from, read the message subject or read the message ID.

Whether the entire message or just part of the message header was transmitted to the mobile phone, the mobile phone user may choose to reply to the message. To reply to the message, the user may simply press a button to automatically transmit to the mobile system information that identifies the mobile phone user and the message to which the user is replying. The mobile phone user may be identified by the mobile phone's mobile identification number (MIN) or by data associated with the received message, such as the message ID described above. Similarly, the message to which the user is replying may be identified by the message ID. In one embodiment, the message ID is a reply code (i.e., a short string of letters and/or numbers, such as 1234). Alternatively, the message ID is a telephone number (or pseudo telephone number) that is associated with a message processing system. For example, the email server may assign a callback telephone number to a specific message. Upon receiving the message and callback number, the mobile phone user may simply activate the reply mode causing the callback number to be transmitted for identifying the mobile phone user and or the specific message being replied to.

Figure 1:
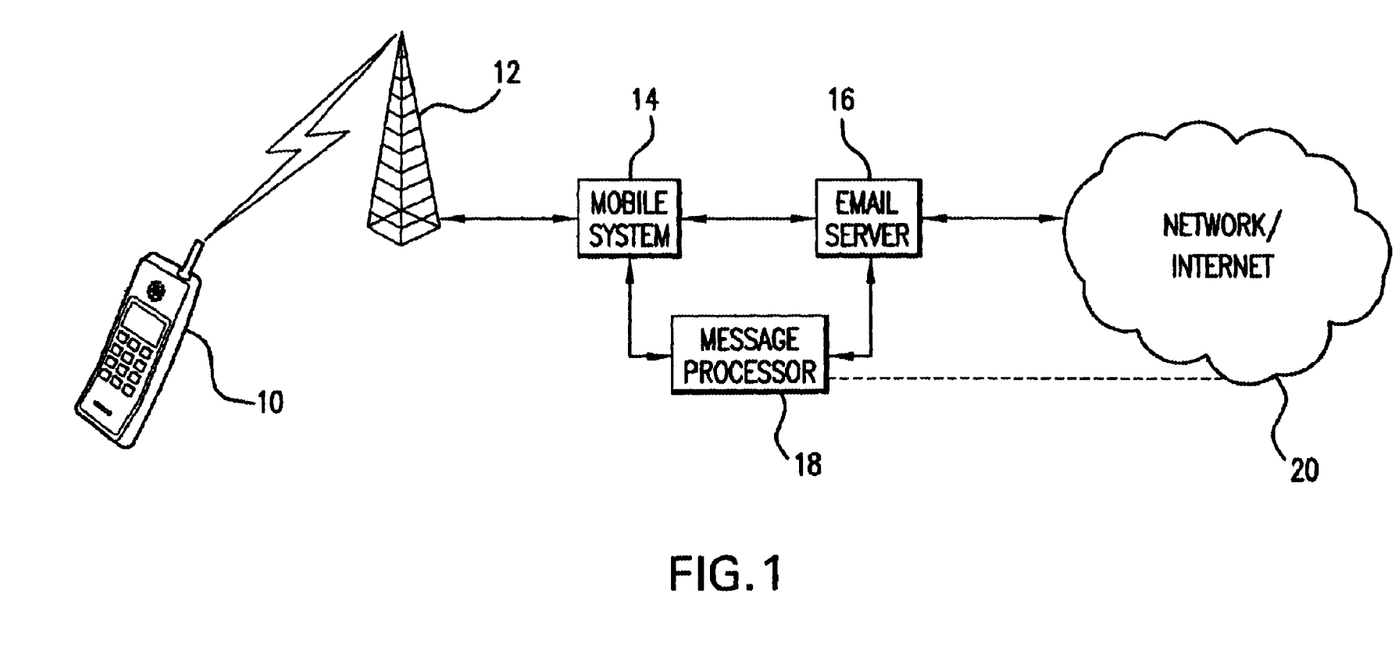
FIG. 1 is a block diagram of a wireless messaging system.

FIG. 1 illustrates the messaging system 100 described above and FIGS. 2A and 2B illustrate the steps performed by the components of system 100 when a mobile phone 10 user replies to an email message with a voice message. First, the email server 16 receives the email message from the Internet 20 or from another source (step 202). The email server 16 stores the message and assigns a message identifier (ID) to the email message (step 204). The message ID may take any number of forms as previously described but for the purpose of example, the email server assigns to the message a telephone callback number (e.g., 202-555-1212) or pseudo telephone number (e.g., #71 or #112).

Figure 2A:
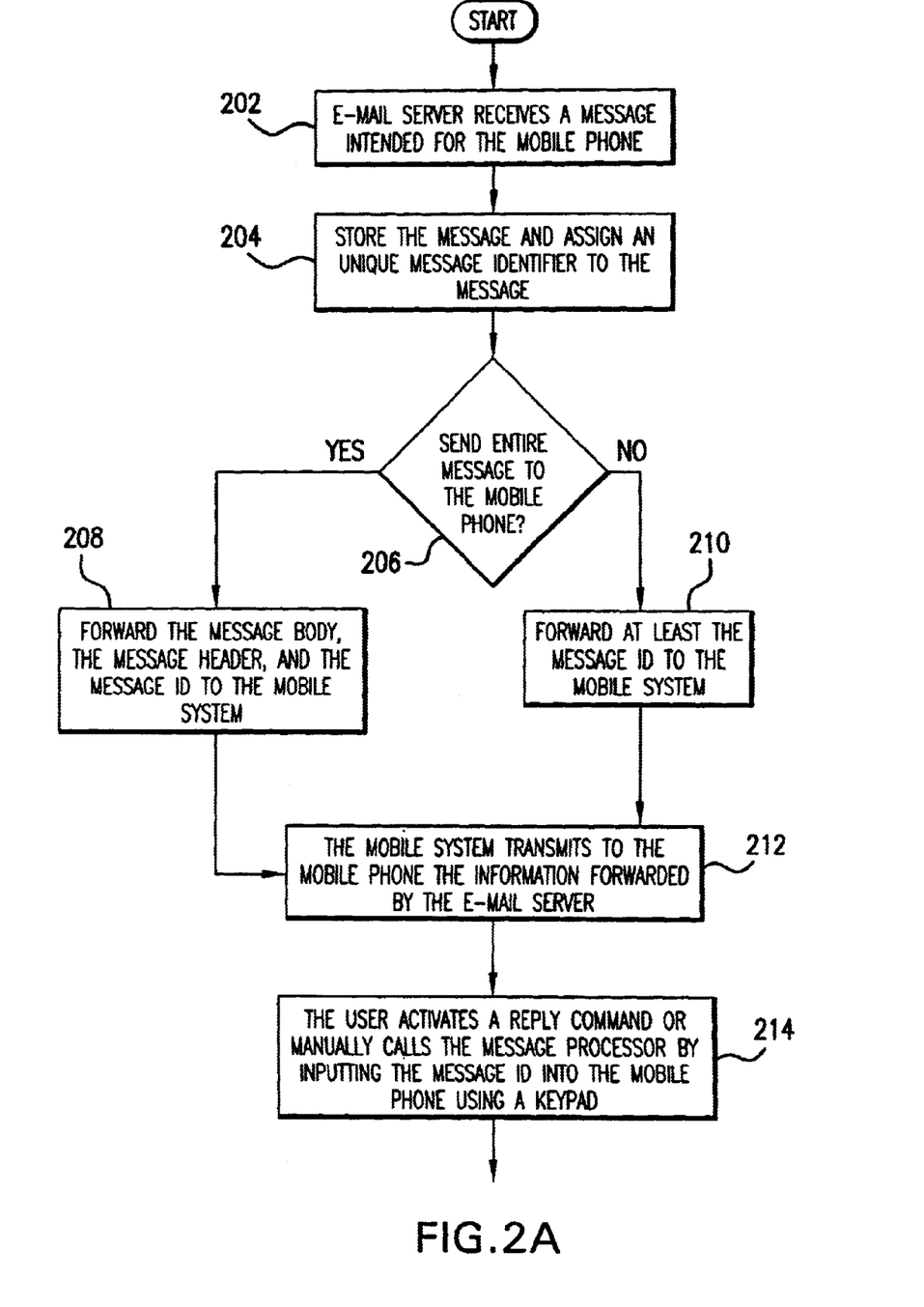
FIGS. 2A and 2B is a flowchart illustrating a process of replying to a message.
Figure 2B:
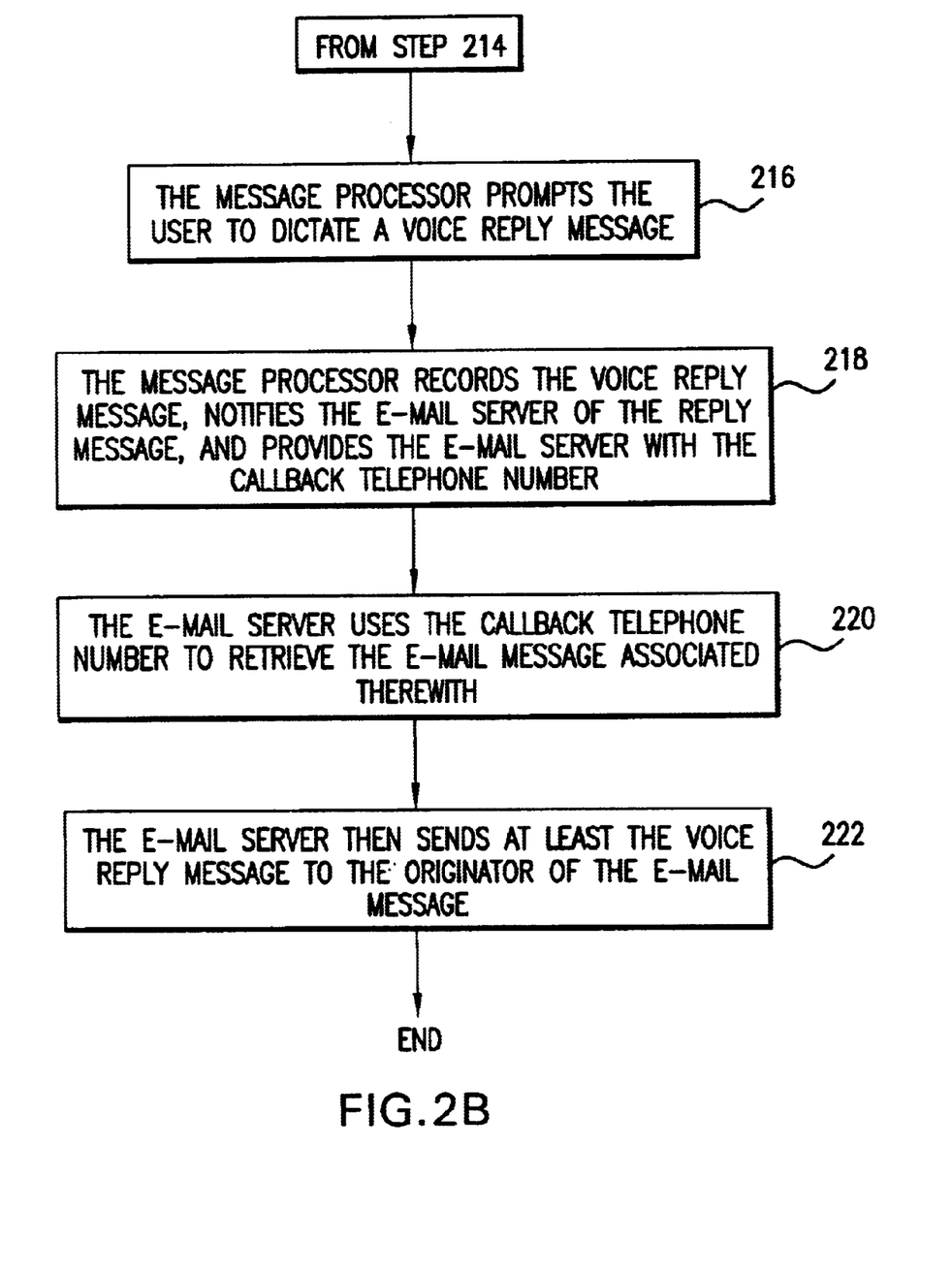

Next, the email server 16 determines whether it should send to the mobile phone 10 the entire email message or just part of the message (for example, one or more fields of the message header) (step 206). This determination can be based on a user profile that is stored at the email server 16, or maybe specified by the user for one or a particular group of email messages. Thus, some users may create a profile that specifies that they want to receive the entire message, whereas other users can specify that they don't want to receive the entire message and can specify which portions of the message they do want to receive. If the entire message should be sent, then the entire message plus the callback number generated in step 204 is forwarded to the mobile system 14 (step 208). If the entire message should not be sent, then the email server 16 forwards, at the least, the callback number generated in step 204 to the mobile system 14 (step 210). The mobile system 14 comprises a message center, a call switching center, and transceiver circuitry necessary for transmitting information to the antenna 12 and the mobile phone 10. The mobile system 14 then transmits to the mobile phone 10 the information forwarded by the email server 16 (step 212).

Upon receiving at the mobile phone 10 the information forwarded by the email server 16, which at the least includes a callback number, the user may choose to send a reply message to the originator of the email message (step 214). The user can accomplish this by activating a reply command. Upon activating the reply command, the mobile phone automatically places a call to the callback number. Alternatively, instead of activating the reply command, the user may manually call the callback number by entering the callback number using a keypad on the mobile phone 10, or by speaking the callback number into the receiver of the mobile phone 10.

In one embodiment, all of the callback numbers generated by the email server are associated with message processor 18, thus upon placing the call to the callback number, the mobile system 14 routes the call to the message processor 18, which then answers the call. The message processor 18 may comprise a voice store and forward system for receiving voice and forwarding voice messages. Voice store and forward systems are readily available and are commonly configured to communicate with networked systems such as the email server 16. The email server 16 communicates with the message processor 18 for establishing a temporary mailbox associated with a specific callback number, which was assigned to a message.

When the message processor 18 receives a call directed to a specific callback number, the message processor 18 prompts the mobile phone user to dictate a reply message for the specific recipient identified by header information contained in the original message (step 216). The message processor 18 records the voice reply message, notifies the email server 16 of the voice message, and provides the email server with the callback telephone number that the user dialed (or that the mobile phone 10 automatically dialed in response to the user activating the reply command) (step 218).

The email server 16 uses the callback telephone number to retrieve the email message associated therewith (step 220). The email server 16 then transmits to the originator of the email message associated with the callback telephone number at least the voice message recorded by the message processor 18 (step 222). In one embodiment, only the voice message is transmitted, in other embodiments, the voice message plus the email message associated with the callback number are transmitted.

The message processor 18 may be replaced with another type of processor depending on the media type. For example, instead of utilizing a voice message processor, a video message processor may be utilized in a broadband system for sending video messages from a mobile phone.

Messages sent from the email server may be transported over the Internet 20 or a private network. The mobile system 14, email system 16 and message processor 18 may be directly connected or they may be connected via a network such as the Internet or the public switched telephone network.

As described above, a mobile phone user may reply to messages that were not transmitted in their entirety to the mobile phone 10. In one embodiment, a mobile phone user might receive only a name for identifying the message originator and/or a subject but not the body of the message. Such would be the case in a system that allows the mobile phone user to decide which messages should be transmitted. In the case where the user does not receive the entire message, the mobile phone user could reply to the originator of the message stating, "I will attend to your message when I return to the office." Optionally, the mobile phone user could read the subject matter and then send a request message to the email server 16, which causes the email server to transmit the entire message or the remainder of the message. Lastly, a mobile phone 10 equipped with a web browser may connect to an Internet based mail system for reading messages. A reply code, callback number or message code may be embedded in the internet mail based message, thereby enabling a mobile phone user to reply to a specific message as described above.

A significant feature of the present invention described above is the ability to "directly access" a specific message from the mobile phone 10 for replying to or for performing an action thereon. Each message transmitted to or accessed from the mobile phone 10 has a message ID associated therewith. A mobile phone user (for example) may reply to a message, delete a message from the email server 16 without retrieving the entire message, forward a message and retrieve a message. The user may also mistakenly delete a message stored in the mobile phone 10 and then retrieve it again from the email server 16. Unlike prior art email and voice mail systems, the present invention provides for direct access of remotely stored messages for retrieval and for performing an action associated therewith, as is described in the above mentioned related U.S. patent application Ser. Nos. 08/934,143, 08/933,344, 08/934,132, and 08/934,337.

The invention of FIG. 1 is shown configured with one email server 16 and one message processor 18. However, multiple email servers 16 and or message processors 18 may be configured in the system, for example, via network connection, direct connect, or the Internet. This approach, when used in conjunction with the email industry standard POP3 mail, allows the mobile phone user to access email from a plurality of email systems.

Any email server 16 may send message alerts, header information, message codes, subject matter, or the body of a message to the mobile system 14 for transmission to the mobile phone 10. Alternatively, the email server 16 and or the message processor 18 (shown in FIG. 1) may act as a master system for commutating with the mobile system 14 and slave email servers 16 and or slave message processors 18 may be configured to communicate with the master email server 16 and or a master voice processor 18 for communicating with the mobile phone 10.

As previously stated, a mobile phone user may receive any part of the message or the entire message. While some mobile phone users may decide to have the system alert them and automatically deliver the entire message, other mobile phone users (power users) may wish to be alerted and automatically receive only the sender's name and the subject of the email message. The mobile phone user may then decide to retrieve the message, delete the message, forward the message or reply to the message. The present invention provides the mobile phone user direct access to and remote control of email messages regardless of where the email messages reside.

The mobile phone 10 can originate email messages by utilizing an address book or by direct entry of an address or an abbreviated address. The address book may be stored in the mobile phone 10, on the email server 16 or in the message processor 18. The mobile phone user may simply select a name from the mobile phone's 10 address book, activate a send message command and send a message to the message processor 18 for delivery to the email server 16 and finally to the addressed destination as previously described.

In another embodiment, the mobile phone user may enter the address manually or enter an abbreviated address associated with the actual address stored on the email server 16 and or the message processor 18. In another embodiment, the mobile phone user may utilize a mobile phone 10 that has Internet access capability such as the so-called "smart phones". Upon accessing the Internet, the mobile phone user may access an Internet based email system such as Hot Mail, Yahoo Mail and the like. The Mobile phone user may then choose a message to read, reply to a message or select a name from an address book for originating a message. The user then selects a send command for sending a message (digital, analog, or other) to the Internet based email system or the email server 16. The selected address book entry may contain addressing information for identifying a particular email server or message processor. Upon the mobile phone user's selection of a message recipient, the mobile phone 10 connects to the identified email server 16, message processor 18, or another system for delivering the email message.

An email message may also be routed to a particular system based on the type of email message For example, a voice massage may be directed to a voice message processor and a text message may be directed to an email server. The mobile phone 10 may connect to the Internet for sending a message or a phone call may be placed to the message processor 18. Alternatively, a mobile phone user may indicate to an email server that he/she wishes to send a message, such as a voice message, to a particular destination. The email server then informs the message processor 18 that the specific mobile phone user wishes to send a message. The message processor then places a call (or connects) to the mobile phone 10 and prompts the mobile phone user to record a message as previously described.

The present invention provides for receiving an email message that has an attachment (i.e., an attached file). The mobile phone 10 does not need any special modifications to receive a text message and for example a voice attachment (i.e., the attached file contains a voice message). When a mobile phone 10 receives a text message having an attachment associated therewith, the mobile phone user may receive all or a portion of the text message, header information, an alert, and a message code which identifies the attachment. To hear the voice message attachment, delete the voice message, reply to the originator of the voice message, or forward the voice message to other people, the mobile phone user simply places a call to the message processor 18, enters the message code that identifies the attachment using a keypad (or if the message processor 18 has voice recognition capability, simply speaks the message code), and enters a code corresponding to an action or speaks a command, such as reply, delete, forward, save, etc. The message processor 18 performs the command.

That is, the message processor 18, upon receiving a call from a mobile phone user, may be configured to identify the mobile phone user utilizing the industry standard caller ID. After identifying the mobile phone user, the message processor prompts the mobile phone user to enter the message code associated with the received message for retrieving the corresponding voice attachment. The voice message file corresponding to the message code is then accessed by the message processor 18. The message processor 18 then plays the message to the mobile phone user over the telephone connection so that the mobile phone user can hear the attachment.

In this manner, unlike prior art voice mail systems, the present invention provides direct access to a specific message. The mobile phone user need not scroll through a large number of messages in order to locate a specific message.

Upon accessing a message file, the message processor 18 allows the user to erase the message, forward the message, or record a reply for the voice message originator. In another embodiment, the mobile telephone may be configured to automatically transmit a message code to a specific message processor as previously described. The main difference between a message code for retrieving a voice attachment and a reply code is that a message code for retrieving a message directs the message processor to play the message while a reply code directs the message processor 18 to record a reply message.

Voice attachments may be retrieved manually by entering a message code or automatically. The mobile phone user may place a call directly to a specific message processor 18 or the call may be automatically directed to a specific message processor that corresponds to a received system identification code or the call may be directed to a specific telephone number associated to the mailbox within the message processor 18 where a specific message resides.

The mobile phone user may additionally access a voice message by accessing a web based email system with a browser-enabled mobile phone 10. The web based email server may supply the message code and upon a mobile phone user activating a retrieve command, the mobile phone 18 places a call to a message processor 18. Alternatively, the web based email server may notify the message processor 18 and the message processor 18 then connects with (or calls) the mobile phone 10 and plays the message to the mobile phone user. The message processor 18 is adapted to play an analog voice file or a digital voice file. The voice message may be streamed to the mobile phone 10 for real time reproduction or the voice file may be transferred to the mobile phone 10 for storage in a memory device within the mobile phone 10. The message is not limited to an analog or digital voice message buy may include streaming video or other multimedia content.

It has been clearly shown that an email text message and an attachment may be received or retrieved by the mobile phone 10. Email messages may be sent to the mobile phone 10 from a number of devices such as for example, a computer with Internet access to a web based email system or from a computer utilizing an email program. The present invention additionally provides for sending email messages from a mobile phone 10 to another mobile phone 10 (i.e. mobile-to-mobile) or to itself (i.e. memo mode). A mobile originated voice message may be recorded and addressed by a mobile phone user to a targeted mobile phone 10. The difference between sending a message to a computer or to a mobile phone 10 is simply the address. The present invention makes it possible to communicate two-way email, including attachments between a computer and a mobile phone and between mobile phones. Mobile phone users need not scroll through messages to access a specific message. Messages may be directly accessed for performing an action thereto. A mobile phone user may simply select a destination address, activate a send message command and record a voice email for any targeted destination. A mobile phone user may activate a reply command and record a voice email that is automatically or manually addressed to a message originator. Messages may be automatically received, manually retrieved, replied to, forwarded, deleted, originated and reproduced by the mobile phone 10. The need for a mobile phone to have browser capability for accessing the Internet to communicate two-way email is eliminated.

As previously stated, the present invention may be configured to deliver entire text email messages to a mobile phone 10 or just a portion of the message, such as the name of the originator and/or the subject. Additionally, a message may be received from the email server 16 on demand by the mobile phone 10. A mobile phone user may automatically receive a name and subject information but may not wish to automatically receive the entire message. After the mobile user reviews the received names and associated subjects, the mobile phone user may decide to retrieve the remainder of the message or the entire message.

A message may be deleted from the mobile phone 10 but it may be again retrieved from the email server 10, if the message is still stored on the email server 10 as previously described. The ability to retrieve a specific message on demand allows for new and improved features for the mobile phone 10, a paging device or other types of wireless email and messaging devices.

One such feature of the present invention is an improved memory management arrangement and method for automatically deleting messages stored in a mobile phone or messaging device when the device's memory is full. For example, prior art paging devices have a limited amount of memory for storing messages. There are times when the memory is full of messages and new messages cannot be received and stored. Other paging devices automatically delete the oldest read message in order to make room in memory for a newly received message. These prior art devices and methods have a disadvantage because once a message is deleted or over written, it cannot be recovered. The present invention provides a system for deleting messages when memory is full but the deleted or over written messages may be again received and stored by the mobile telephone 10 as will be described hereinafter.

The mobile phone 10 may be configured so that an internal processor executes the following process: Receive and store messages in memory. When a message is received and memory is full, over write one or more message bodies, but retain the message header and the message ID associated with the message, to make room for the new message. Store the new message. When over writing message bodies, over write the oldest read message body first, when there are no read message bodies left, over write the oldest unread message body. When there are no more message bodies, over write the oldest read subject first. When there are no more read subjects, over write the oldest unread subject. The mobile phone 10 may be configured to delete the name and header information using the same priority as described above.

The above-described process causes the mobile phone 10 to over write only message bodies when there is not enough memory to store an additional message. The mobile phone user may continue to save and view information that identifies the message originator (the name) and information describing the message (the subject). If the mobile phone user desires to read an entire message body that was deleted or over written, a retrieve command may be activated by the mobile phone user for causing the mobile phone 10 to transmit the selected message ID to the email server 16. Upon receiving the retrieval request and message ID, the email server 16 sends the email message corresponding to the message ID to the requesting mobile phone 10. An over written or deleted message can now be recovered.

The present invention provides for sending and receiving messages based on one or more variables. The email server 16 and the message processor 18 may be configured with Instant Messenger software such as is provided by Microsoft, America On Line, AT&T and others. These programs provide notification when a computer-messaging device is on line or the operator is logged in. When the message processor 18 or email server 16 receives a message for the mobile phone 10, the message may be held until the mobile phone is on line. In other words, when the user is logged in or when the presence of the user is detected, the message is delivered. Conversely, when a message is sent to a mobile phone 10, the message may be held by the email server 16 or the message processor 18 until the presence of the mobile phone 10 or the mobile phone user is detected. Detection of the mobile phone 10 may for example be accomplished by interfacing a home location register (HLR) to the email server 16 and the message processor 18. HLR equipment is readily available and used extensively by mobile phone companies to provide detection of a mobile phone in a particular service area in order to route calls. Detection of a mobile phone user may also be accomplished by detecting user-activated commands that are transmitted to the email server 16 or the message processor 18. Detection of an operator, mobile phone user or active messaging device enables the present invention to perform actions responsive to the status of messaging devices or the presence of their respective user. The email server 16 may automatically route messages to a mobile phone 10 when the mobile phone user is utilizing the mobile phone 10. Then, when the mobile phone user turns the mobile phone 10 off and logs in to an office computer, the email server routes messages to the office computer. The present invention may perform any number of actions or combination of actions based on a mobile phone user activated command or by automatically detecting the status of the mobile phone 10 and or the presence of the mobile phone user. Messages may even be redirected automatically to a mobile phone user's computer email service if the message cannot be delivered to the mobile phone 10 because the mobile phone 10 was out of range or turned off.

The email server 16 and the message processor 18 may automatically perform an action or sequence of actions based on the time of day, the date, the status of a mobile phone 10, the presence of a user, user activity, geographic location of the mobile phone or any number of conditions which may be transmitted to the email server 16 or the message processor 18. Sensors may be added to the mobile phone 10 and data from the sensors may be automatically transmitted or manually sent by the mobile phone user. A temperature sensor, for example, may be included in the mobile phone 10 wherein temperature readings are automatically transmitted to the email server 16. Based on temperature, the location of the mobile phone 10 and the presence of the mobile phone user, the email server 16 or the message processor may for example send an email message to the mobile phone user that includes an advertisement stating, "The temperature is 98 degrees. Please drink Coke. 35 cent special one block away at the super store." Alternatively, the mobile phone user may configure the present invention so that messages from particular people are delivered to the mobile phone 10 on week days between 9:00 am and 5:00 p but otherwise routed to the mobile phone user's home computer and have copies of all message activity go to an office email system. Messages may also be filtered based on the location of the mobile phone 10 so that very important messages are routed to the mobile phone 10 when the mobile phone user is out of town with the mobile phone 10. A mobile phone user may also configure the system to send a notification message to the mobile phone 10 when another mobile phone 10 user or a computer device user is detected by the email server 16 or the message processor 18.

The present invention may be utilized in telephone systems, paging systems, email systems, and numerous communications systems.

I claim:

1. A method for notifying a user that the user has a voice message and for providing the user with direct access to the voice message, wherein the user has a wireless messaging device configured to receive text messages, comprising the steps of:

storing the voice message;

associating a message code with the voice message;

generating a text message, wherein the text message includes the message code;

transmitting the text message to the wireless messaging device;

receiving at a voice message processor a telephone call placed from the wireless messaging device;

receiving the message code from the wireless messaging device;

using the message code transmitted from the wireless messaging device to retrieve the stored voice message; and transmitting the voice message to the wireless messaging device, thereby enabling the wireless messaging device to reproduce the voice message.

2. A method for notifying a user that the user has a voice message and for providing the user with direct access to the voice message, wherein the user has a wireless messaging device configured to receive text messages, comprising the steps of:

storing the voice message;

associating a message code with the voice message, the message code including a callback number;

generating a text message, wherein the text message includes the message code;

transmitting the text message to the wireless messaging device;

receiving at a voice message processor a telephone call placed from the wireless messaging device, wherein the telephone number associated with the telephone call is the callback number;

retrieving the stored voice message; and transmitting the voice message to the wireless messaging device, thereby enabling the wireless messaging device to reproduce the voice message.

3. A method for enabling a user having a wireless messaging device capable of receiving text messages and making telephone calls to create a voice message in reply to a message intended for the user and to have the voice message transmitted to the originator of the message intended for the user, comprising the steps of:

receiving the message intended for the user, wherein the message intended for the user comprises a body and a header;

storing the message intended for the user;

assigning a message identifier to the message intended for the user;

transmitting the message identifier and at least part of the message header to the wireless messaging device;

receiving, at a message processor, a phone call placed by the wireless messaging device;

prompting the user of the wireless messaging device to transmit a message identifier to the message processor;

receiving a message identifier transmitted by the wireless messaging device;

prompting the user of the wireless messaging device to dictate a voice message;

recording the voice message dictated by the user;

determining an address associated with the originator of the message intended for the user; and transmitting the recorded voice message to the address.

4. A method for enabling a user having a wireless messaging device capable of receiving text messages and making telephone calls to create a voice message in reply to a message intended for the user and to have the voice message transmitted to the originator of the message intended for the user, comprising the steps of:

receiving the message intended for the user, wherein the message intended for the user comprises a body and a header;

storing the message intended for the user;

assigning a message identifier to the message intended for the user, the message identifier including a callback number;

transmitting the message identifier and at least part of the message header to the wireless messaging device;

receiving, at a message processor, a telephone call placed by the wireless messaging device, wherein the telephone number associated wit the telephone call is the callback number;

prompting the user of the wireless messaging device to dictate a voice message;

recording the voice message dictated by the user;

determining an address associated with the originator of the message intended for the user; and transmitting the recorded voice message to the address.

5. The method of claim 1, wherein the step of transmitting the text message to the wireless messaging device comprises the step of transmitting the text message to a mobile system that comprises a message center and a transceiver for wirelessly transmitting information to the wireless messaging device.

6. The method of claim 1, further comprising the step of prompting the user of the wireless messaging device to transmit a message code to the message processor, wherein the prompting step occurs before the step of receiving the message code from the wireless messaging device.

7. The method of claim 1, wherein the wireless messaging device comprises a mobile phone.

8. The method of claim 1, wherein the wireless messaging device comprises a personal digital assistant.

9. The method of claim 2, wherein the callback number is a telephone number.

10. The method of claim 2, wherein the callback number is a pseudo telephone number.

11. The method of claim 2, wherein the wireless messaging device comprises a mobile phone.

12. The method of claim 2, wherein the wireless messaging device comprises a personal digital assistant.

13. The method of claim 2, wherein the step of retrieving the stored voice message comprises the step of using at least a part of the message code to retrieve the stored voice message.

14. The method of claim 13, wherein the at least a part of the message code includes the callback number.

15. The method of claim 3, wherein the step of determining an address associated with the originator of the message intended for the user comprises the step of using the message identifier transmitted to the message processor to determine the address associated with the originator of the message.

16. The method of claim 3, wherein the wireless messaging device comprises a mobile phone.

17. The method of claim 3, wherein the wireless messaging device comprises a personal digital assistant.

18. The method of claim 4, wherein the callback number is a telephone number.

19. The method of claim 4, wherein the callback number is a pseudo telephone number.

20. The method of claim 4, wherein the wireless messaging device comprises a mobile phone.

21. The method of claim 4, wherein the wireless messaging device comprises a personal digital assistant.

22. The method of claim 4, wherein the step of determining an address associated with the originator of the message intended for the user comprises the step of using the callback number to determine the address associated with the originator of the message.

* * * * *

UNITED STATES PATENT AND TRADEMARK OFFICE
CERTIFICATE OF CORRECTION

PATENT NO. : 6,636,733 B1
DATED : October 21, 2003
INVENTOR(S) : Richard J. Helferich It is certified that error appears in the above-identified patent and that said Letters Patent is hereby corrected as shown below:

Column 11,
Line 58, "associated wit" should read -- associated with --.

Signed and Sealed this

Twentieth Day of December, 2005

JON W. DUDAS
*Director of the United States Patent and Trademark Office*